G. W. SCHAFER.
Machines for Paring Horses Hoofs.

No. 138,101. Patented April 22, 1873.

UNITED STATES PATENT OFFICE.

GEORGE W. SCHAFER, OF ST. CHARLES, MISSOURI.

IMPROVEMENT IN MACHINES FOR PARING HORSES' HOOFS.

Specification forming part of Letters Patent No. 138,101, dated April 22, 1873; application filed September 7, 1872.

*To all whom it may concern:*

Be it known that I, GEORGE W. SCHAFER, of St. Charles, in the county of St. Charles and State of Missouri, have invented a new and useful Improvement in Machine for Paring Horses' Hoofs, of which the following is a specification:

This invention relates to apparatus for facilitating the paring of horses' hoofs preparatory to shoeing, whereby that operation is performed with greater safety to the foot and with greater ease to the operator than when done in the ordinary manner; and it consists in a circular plate or frame and cross-bar having a knife and operating-lever attached thereto, as hereinafter more fully described.

Figure 1:
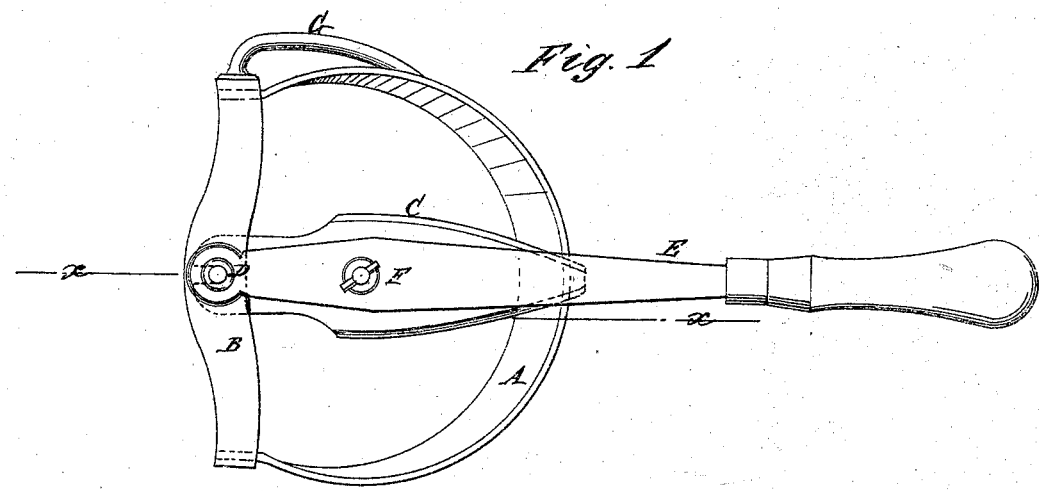
Figure 2:
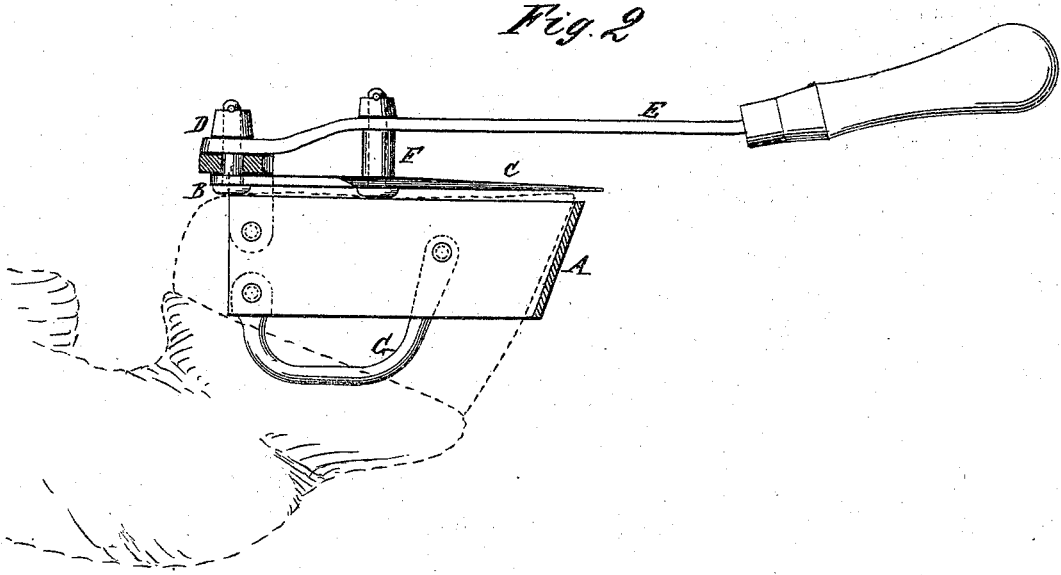

In the accompanying drawing, Figure 1 is a top or plan view of the machine. Fig. 2 is a vertical section thereof taken on the line $x\ x$, Fig. 1, representing the machine as applied to the horse's hoof, the latter being seen in dotted lines.

Similar letters of reference indicate corresponding parts.

A is a circular piece of metal two inches, more or less, in width, forming something more than a semicircle, having a bar, B, extending from one end to the other. This circular plate corresponds with the size of the hoof, and is placed on the hoof, as seen in Fig. 2, when used. The ends of the plate A are at right angles with the bar B; but, in forming the circle, the plate is made dishing so as to fit the hoof with the bar B passing across the heel on a plane parallel with the bottom of the hoof. C represents a knife-blade with a double edge fastened to the under side of the bar B by a pivot-bolt, D. The point of this knife reaches over the edge of the circle A, as seen in the drawing. E is the handle or lever, by means of which the machine is operated. This lever is attached to the bar B by the pivot-bolt D, and is connected with knife by a stud-bolt, F. The pivot-bolt D is, therefore, the fulcrum of the lever, and the knife is moved back and forth as the lever is moved. The edge of the circle forms a guide for paring the hoof, the edge of the knife being placed a little above the edge of the circle, but is sprung down to the edge of the circle by means of the lever, so that the portion of the hoof which protrudes will be pared even with the edge of the circle. This portion of the hoof will ordinarily be the toe, which will be pared level and true without paring the heel. G is a handle on the circle, which is grasped by the operator, and allows him to counteract the force of the lever on the horse's foot. The circle governs the action of the knife and keeps it steady, so that it cannot catch or injure the hoof.

The blade is easily removed for sharpening or other purposes.

The machine may be made to fit any-sized hoof, and is used without endangering the frog of the hoof by any one acquainted with that branch of business.

Having thus described my invention, I claim as new and desire to secure by Letters Patent—

A machine for paring the hoofs of horses, consisting of the circular plate A, bar B, knife-blade C, handle or lever E, pivot-bolt D, stud-bolt F, and handle G, arranged substantially as shown and described.

GEORGE WILLIAM SCHAFER.

Witnesses:
   E. CURTIS RICE,
   JOHN B. SCHUTTEN.